US012438297B2

(12) United States Patent
Porebski et al.

(10) Patent No.: US 12,438,297 B2
(45) Date of Patent: Oct. 7, 2025

(54) BUSBAR PORTION WITH INTEGRAL CONNECTION AND RETENTION MEANS

(71) Applicant: Aptiv Technologies AG, Schaffhausen (CH)

(72) Inventors: Grzegorz Porebski, Podleze (PL); Jakub Walkowski, Rzezawa (PL); Piotr Grodzki, Rzezawa (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 426 days.

(21) Appl. No.: 17/965,872

(22) Filed: Oct. 14, 2022

(65) Prior Publication Data
US 2023/0120400 A1 Apr. 20, 2023

(30) Foreign Application Priority Data

Oct. 15, 2021 (EP) ...................................... 21202931
Oct. 10, 2022 (EP) ...................................... 22200504

(51) Int. Cl.
*H01R 13/04* (2006.01)
*H01R 13/03* (2006.01)
*H01R 43/16* (2006.01)

(52) U.S. Cl.
CPC ............. *H01R 13/04* (2013.01); *H01R 13/03* (2013.01); *H01R 43/16* (2013.01)

(58) Field of Classification Search
CPC ......... H01R 13/03; H01R 13/04; H01R 43/16
USPC ....................................................... 439/886
See application file for complete search history.

(56) References Cited

U.S. PATENT DOCUMENTS

| 2,097,324 | A | * | 10/1937 | Hill ...................... | H02B 13/005 |
| | | | | | 174/88 B |
| 2018/0261930 | A1 | * | 9/2018 | Iizuka .................. | H01R 13/405 |
| 2020/0169031 | A1 | * | 5/2020 | Nakashima ........ | H01R 13/5205 |

FOREIGN PATENT DOCUMENTS

| CN | 201142239 | Y | * | 10/2008 | |
| CN | 106782849 | A | | 5/2017 | |
| CN | 106410467 | B | | 11/2018 | |
| CN | 208706911 | U | * | 4/2019 | |
| CN | 110504559 | B | * | 11/2020 | |
| JP | 2011096392 | A | | 5/2011 | |
| KR | 20050038685 | A | * | 4/2005 | ............... H01B 1/02 |
| KR | 20200116880 | A | * | 10/2020 | |
| WO | WO-2017154543 | A1 | * | 9/2017 | ............. H01B 1/026 |
| WO | WO-2020121834 | A1 | * | 6/2020 | ............... H01R 9/24 |

OTHER PUBLICATIONS

Extended European search report for application No. 21202931.8, mailed Mar. 31, 2022, 7 pages.
(Continued)

*Primary Examiner* — Peter G Leigh
(74) *Attorney, Agent, or Firm* — Billion & Armitage (57) ABSTRACT

A busbar portion includes a busbar conductor and a busbar end which is integrally formed with the busbar conductor. The busbar end has a connection portion. The connection portion is configured for being plugged to a mating connector to establish an electrical connection. The busbar end further incorporates a retention means which is configured to engage with a corresponding retention means to receive pull forces being imposed on the busbar portion in a direction opposite to a mating direction.

23 Claims, 4 Drawing Sheets

(56) References Cited

OTHER PUBLICATIONS

"Communication pursuant to Art 94(3) EPC for European Application No. 22 200 504.3"; European Patent Office; mailed on Jun. 20, 2025; 5 Pages.
"Machine Translation of CN 106782849 A", 20 Pages.

* cited by examiner

BUSBAR PORTION WITH INTEGRAL CONNECTION AND RETENTION MEANS

CROSS-REFERENCE TO RELATED APPLICATION

This application claims benefit of priority to European Patent Application No. 21202931.8 filed on Oct. 15, 2021, and European Patent Application No. 22200504.3 filed on Oct. 10, 2022, the entire disclosure of each of which is hereby incorporated by reference.

TECHNICAL FIELD OF THE INVENTION

The present invention relates to a busbar portion, a busbar including the busbar portion, a wiring harness including the busbar and a method for manufacturing the busbar portion.

BACKGROUND

In modern vehicles, the transmission of electric power and signals is becoming increasingly important. This particularly applies to electric vehicles and hybrid vehicles, whose functionality is highly based on a stable energy supply from a battery to one or more electrical devices, such as electrical engines.

To transmit electric power and signals, a wiring harness is usually utilized in the automotive industry. A wiring harness, also known as a cable harness, is an assembly of electric conductors such as busbars, cables and/or wires. Wiring harnesses thereby provide several advantages over loose conductors. The wiring harnesses are prefabricated and then mounted within a vehicle and connected to respective electric interfaces.

High electric currents and high voltages in hybrid and electric vehicles are often transmitted by means of busbars. The busbars may form part of the wiring harness and/or of the electric architecture of the vehicle which may be connected to the wiring harness. For example, busbars may be directly attached to the battery of the vehicle as an interface for further electric connections. Moreover, a busbar provided in the wiring harness may serve to conduct electric power from a battery of the vehicle to an electric motor of the vehicle and/or from a charging port to the battery. For electric vehicles, it is crucial that a busbar, which for example is supposed to provide energy from the battery to the vehicle, is connected to a respective conductor safely and with as little electric resistance as possible. Current solutions for the connection of busbars with further conductors include welded, screwed, and/or bolted connections. These types of connections are robust since they withstand high/low temperatures, humidity, and vibrations. However, such types of connections require many steps and complex processes to integrate them into electric vehicle architectures. For example, it is complicated to weld a connection between a busbar and a cable in the wiring harness while the vehicle is on the production line. Same applies for screwed and/or bolted connections. Further the welded, screwed, and/or bolted connections also increase the electric resistance. Moreover, most of the existing solutions are one-time use, which leads to difficulties in system integration and requires special processes for harness manufacturing and final assembly in electric vehicles.

SUMMARY

It is an aim of the present disclosure to provide a busbar portion, a busbar, a wiring harness and a method for manufacturing a busbar portion that addresses at least some of the issues discussed above.

In particular, the issues are addressed by a busbar portion including a busbar conductor, and a busbar end which is integrally formed with the busbar conductor. The busbar end includes a connection portion, the connection portion being configured for being plugged to a mating connector to establish an electrical connection, wherein the busbar end further includes a retention means, which is configured to engage with a corresponding retention means to receive pull forces being imposed on the busbar portion in a direction opposite to a mating direction.

With the busbar end being integrally formed with the busbar conductor the electric resistance can be reduced. The term "integrally formed" means that a conducting material of the busbar conductor continuously transitions to the busbar end. Thus, no material boundary exists. Hence, the busbar end may not be differentiated from the busbar conductor. The busbar end is suited to be used as a terminal in a mating connector or plug connector, i.e., the connection portion of the busbar end is configured to be e.g., directly mated into a mating connector by means of an electrical plug connector. Hence, there is no need to screw, weld or otherwise fasten the busbar to a respective terminal and/or substrate. This allows to reduce the number of parts as well as the electrical resistance and further allows for a more reliable electrical connection.

The busbar conductor may be rigid and/or flexible. Moreover, the busbar conductor may be at least partially surrounded by an isolation. Thereby, the isolation is preferably removed or removable from the busbar end.

The retention means may be further configured such that when being engaged with a corresponding retention means the retention means may be disengaged. This allows disassembling, exchanging, or maintenance of the busbar and/or a respective cable harness.

Further, the retention means may be configured such that engaging with the corresponding retention means may be conducted by plugging. Even further, the retention means may be configured such that disengaging from the corresponding retention means may be conducted by unplugging. Preferably, the retention means is configured such that no additional fastening means is necessary for keeping the connection portion safely plugged to the mating connector. Particularly preferred, the retention means is configured such that no screwing, welding, gluing, and/or bolting is necessary for keeping the connection portion safely plugged to the mating connector. Thus, the busbar portion allows improved and/or more flexible connections with a mating connector.

The mating connector may be a standard mating connector. The standard mating connector preferably is a high-voltage terminal. Further preferably, the standard mating connector may be a standardized mating connector, such as a standardized high-voltage terminal. By plugging the connection portion of the busbar end directly into the mating connector the number of connection parts may be reduced.

The busbar conductor may include a conductor material. The conductor material may include one or more of the following: copper, aluminum, a copper based alloy, and/or an aluminum based alloy. Further, the conductor material may include brass.

The busbar end may include a coated area in which a coating material is applied. The coating material may be selected from the group of tin, nickel, silver, gold, a tin based alloy, and/or a nickel based alloy. The coating may be applied directly on the busbar conductor. Alternatively, there may be additional conducting layer(s), such as a plating, between the busbar conductor and the coating material. In some embodiments, the coating material may be applied only on the busbar end. The coating may be applied by chemical vapor deposition, physical vapor deposition, spraying, thermal spraying, dipping, and/or electroplating. The coating material may serve to prevent oxidation of the conductor material. Further, the coating material may improve the electrical conductivity properties.

The busbar end may further include a plated area, in which a plating material is plated on the busbar conductor. The plated area preferably at least partially corresponds to the connection portion. Further preferably the plating material includes tin, nickel, silver, gold, a tin based alloy, and/or a nickel based alloy. The plating material on the busbar conductor is preferably in direct contact with the conductor material. The plating material may serve to prevent oxidation of the conductor material. Further, the plating material may improve the electrical conductivity properties.

Plating may be referred to as the process of applying one or more metal layers to another base metal on one or more sides. By means of plating it is preferred to create a bond that is as insoluble as possible. The bond may be achieved by pressure and/or temperature and/or subsequent heat treatment. Particularly, plating may be conducted by roll weld plating or rolling on thin metal foils, i.e., cladding, welding on, casting on, dipping, explosive plating, or by galvanotechnical processes, e.g., electroplating.

The plating may be applied directly on the busbar conductor. Alternatively, there may be additional conducting layer(s) between the busbar conductor and the plating material. The plating material may be at least partially sandwiched between the busbar conductor and the coating material. The coating material may serve to protect the plating material. Further, the coating material may increase the electrical conductivity properties of the plating material. Even further, the coating material may change the surface properties of the plating material so that the friction and/or the adhesion of the connection portion is increased. A more reliable connection between the plug connector and the mating connector may thus be achieved.

Optionally, a subarea of the plated area is coated. Thus, the coated area may lie within the plated area. This may improve the electrical conductive properties of the plated area locally. Further the friction and/or the adhesion of the connection portion may be increased locally. Further optionally, the coated area may expand beyond the plated area. Thus, the transition between the plated area and the underlying conductor material may be softened. Even further optionally, the coated area and the plated area may correspond to each other. Generally, the coating material may be applied to the plating material before the plating material is plated onto the conductor material. Thus, efficiency in manufacturing may be increased.

The busbar end may be at least partially surrounded by an electrical conducting sleeve. The sleeve may have better conductive properties than the conductor material. Further, the sleeve may be harder than the conductor material. Thus, wear and/or abrasion may be decreased, particularly in high vibration environments. The sleeve may be crimped and/or shrunk on the busbar end. Moreover, the sleeve may be plated onto the busbar end. The sleeve may be adapted to fit into the mating connector. Further, the sleeve may include a conductive material. The conductive material may include tin, nickel, silver, gold, a tin based alloy, and/or a nickel based alloy.

The connection portion may include a tip portion. An edge of the tip portion is optionally chamfered. The edge is preferably chamfered such that the tip portion has a tapered shape. Further preferably, each edge of the tip portion which is perpendicular to the mating direction is chamfered. The chamfered edge may serve that the connection portion of the busbar end so that it is easily plugged to the mating connector. Further, the chamfered edge and preferably the tapered shape may allow the connection portion of the busbar end to be easily inserted into the mating connector.

The busbar end and/or the busbar conductor may have a rectangular cross section. The rectangular cross section preferably has a width from 15 mm to 45 mm, more preferably from 22 mm to 28 mm, even more preferably from 23 mm to 27 mm, and most preferably from 24 mm to 26 mm. The rectangular cross section preferably has a height from 2 mm to 7 mm, more preferably from 3 mm to 6 mm, even more preferably from 4 mm to 5.5 mm, and most preferably from 4.5 mm to 5 mm. Further, at least a portion of the busbar may have a rectangular cross section. Even further, the busbar may have a rectangular cross section.

Alternatively, the busbar end and/or the busbar conductor may have an annular cross section. The annular cross section preferably has a diameter from 10 mm to 16 mm, more preferably from 11 mm to 15 mm, even more preferably from 12 mm to 14 mm, and most preferably from 12 mm to 13 mm. Further, at least the busbar portion may have an annular cross section. Even further, the busbar may have an annular cross section.

The cross section of the busbar may change. For example, the busbar end may have a cross section that differs from the cross section of the busbar conductor and/or of another busbar end. The cross section may change in shape and/or dimensions. For example, the busbar conductor may have a substantially rectangular cross section, while the busbar end has an annular cross section, or vice versa. Further, the busbar end and the busbar conductor may have a cross section of a similar shape (e.g., both rectangular or both annular), while the dimension of the cross section is different. For example, the busbar end may have a smaller cross-sectional area than the busbar conductor.

The busbar conductor may have the shape of a strip, a bar, a beam, a rod, a cylinder, a solid tube and/or a hollow tube.

A cross section of the busbar conductor may have a cross sectional area from 80 mm$^2$ to 200 mm$^2$, preferably from 90 mm$^2$ to 190 mm$^2$, and even more preferably from 95 mm$^2$ to 180 mm$^2$.

For aluminum and/or an aluminum based alloy as conductor material the cross section of the busbar conductor preferably has a cross sectional area from 100 mm$^2$ to 200 mm$^2$, preferably from 110 mm$^2$ to 190 mm$^2$, and even more preferably from 120 mm$^2$ to 180 mm$^2$. Thus, the cross section of the busbar conductor may be improved for the conductive properties of aluminum and/or an aluminum based alloy.

For copper and/or a copper based alloy as conductor material the cross section of the busbar conductor preferably has a cross sectional area from 80 mm$^2$ to 180 mm$^2$, preferably from 90 mm$^2$ to 170 mm$^2$, and even more preferably from 95 mm$^2$ to 160 mm$^2$. Thus, the cross section of the busbar conductor may be improved for the conductive properties of copper and/or a copper based alloy.

The busbar portion may be configured for being used in a high-voltage circuit of an electrical vehicle. The busbar portion is preferably configured for conducting just one electrical phase. By conducting just one electrical phase, the busbar portion is more robust than if it would conduct multiple phases as a short circuit between the multiple phases due to vibrations, shocks, conductive particles and/or humidity is not possible.

The busbar portion may be configured for an amperage (permanent load) of at least 10 amp, preferably at least 20 amp, further preferably at least 50 amp, even further preferably at least 100 amp, and most preferably at least 300 amp. Moreover, the busbar portion may be configured for an amperage (permanent load) of at most 600 amp, preferably at most 550 amp, further preferably at most 500 amp, even further preferably at most 450 amp, and most preferably at most 400 amp. Furthermore, the busbar portion may be configured for an amperage (permanent load) from 10 amp to 600 amp, preferably from 20 amp to 550 amp, further preferably from 50 amp to 500 amp, even further preferably from 100 amp to 450 amp, and most preferably from 300 amp to 400 amp.

Further, the busbar portion may be configured for a voltage (permanent load) of at least 50 volt, preferably at least 100 volt, further preferably at least 200 volts and even further preferably at least 300 volt and most preferably at least 400 V (permanent load). Further, the busbar portion may be configured for a voltage of at most at least 1500 volt, preferably at most 1200 volt, further preferably at most 1100 volts, and even further preferably at most 1000 volt and most preferably at most 1000 V. Furthermore, the busbar portion may be configured for a voltage (permanent load) in the range of 50 volt to 1500 volt, preferably from 100 volt to 1200 volt, further preferably from 200 volt to 1100 volt, even further preferably from 300 volt to 1000 volt, and most preferably from 400 volt to 1000 volt. Further, the busbar portion may be configured for a peak load that is at least 1.5 times the permanent load (voltage and/or amperage), optionally at least 2 times the permanent load (voltage and/or amperage), and further optionally at least 3 times the permanent load (voltage and/or amperage). Further, the busbar portion may be configured for direct current (DC) and/or alternating current (AC).

The busbar portion may be configured for the transmission of electrical power of at least 5 kilowatt, preferably at least 10 kilowatt, further preferably at least 20 kilowatts, and even further preferably at least 50 kilowatt, and most preferably at least 100 kilowatt (permanent load). Further, the busbar portion may be configured for the transmission of electrical power of at most at least 500 kilowatt, preferably at most 450 kilowatt, further preferably at most 400 kilowatt, and even further preferably at most 350 kilowatt, and most preferably at most 300 kilowatt (permanent load). Furthermore, the busbar portion may be configured for the transmission of electrical power from 5 kilowatt to 500 kilowatt, preferably from 10 kilowatt to 450 kilowatt, further preferably from 20 kilowatt to 400 kilowatt, even further preferably from 50 kilowatt to 350 kilowatt, and most preferably from 100 kilowatt to 300 kilowatt (permanent load).

The retention means may be a recess and/or a protrusion. The retention means preferably encircles the busbar conductor. The retention means is preferably formed by deformation. Preferably, the conductor material is deformed. The deformation may be conducted by embossing, stamping, punching, pressing and/or squeezing. Moreover, the retention means may be formed by cutting, milling, turning, machining, and/or drilling. The retention means may be formed by the plating material. For example, the plating material may form an undercut relative to the underlying conductor material.

The recess may be a through hole, a cut out, a groove, and/or a slot. Further, the recess may be an undercut and/or an indentation. The protrusion may further be welded, screwed, and/or glued onto the busbar end.

The retention means may be provided inside the busbar portion and/or on any side of the busbar portion, e.g., on a lateral edge and/or flat portion of a busbar portion having a rectangular cross section. As another example, the retention means may be provided on any portion of a busbar portion having an annular cross section.

The busbar portion may include a tip protection means. The tip protection means may avoid a contact with a tip portion of the connection portion. Particularly, the tip protection means is configured so that finger contact may be avoided. The tip protection means may be attached at the tip portion. The tip portion may be an insulative element formed of rubber or another polymer. Further, the tips protection means may be coated onto the tip portion. The tip protection means may form part of the connection portion.

Further, the object is at least partially achieved by a busbar which includes a busbar portion that is configured as described above. The busbar further includes another busbar end. The busbar conductor and/or the busbar end(s) of the busbar may be formed as described above. Further, the busbar may include a switch and/or a branch. The busbar may be configured for being coupled to a wiring harness of a vehicle, in particular of an electric vehicle.

Moreover, the object is at least partially achieved by a wiring harness, in particular for an electrical vehicle, wherein the wiring harness includes a busbar as described above.

The busbar portion, the busbar and/or the wiring harness may be used in building services, automotive industry, aircraft construction, shipbuilding and/or plant engineering.

Even further, the object is at least partially achieved by a method for manufacturing a busbar portion. The method includes the steps of:
(a) providing a busbar, including a busbar end;
(b) optionally, removing an isolation from the busbar end;
(c) optionally machining the busbar end;
(d) providing a retention means at the busbar end, and
(e) optionally covering the busbar end, wherein covering the busbar end may include coating an area of the busbar end, plating an area of the busbar end and/or providing a sleeve which at least partially surrounds the busbar end.

The method steps are directed to obtain the busbar portion as specified above. Thus, further details regarding the method steps may be obtained from the detailed description of the features of the busbar given above.

The step of machining the busbar end may include chamfering an edge. Further, the step of machining may include the machining of a surface of the busbar end. Thus, a connection portion at the busbar end may be obtained, which may be inserted into a mating connector. Further, the machining may serve to remove a first layer of a conductor material of a busbar conductor. Thus, the conductivity may be increased.

Providing a retention means, as specified above, may include deforming the conductor material. The deformation may be conducted by embossing, stamping, punching, pressing and/or squeezing. Moreover, the retention means may be provided by cutting, milling, turning, machining and/or drilling.

BRIEF DESCRIPTION OF THE DRAWINGS

The present invention is now described, by way of example with reference to the accompanying drawings, in which.

DETAILED DESCRIPTION

Figure 1:
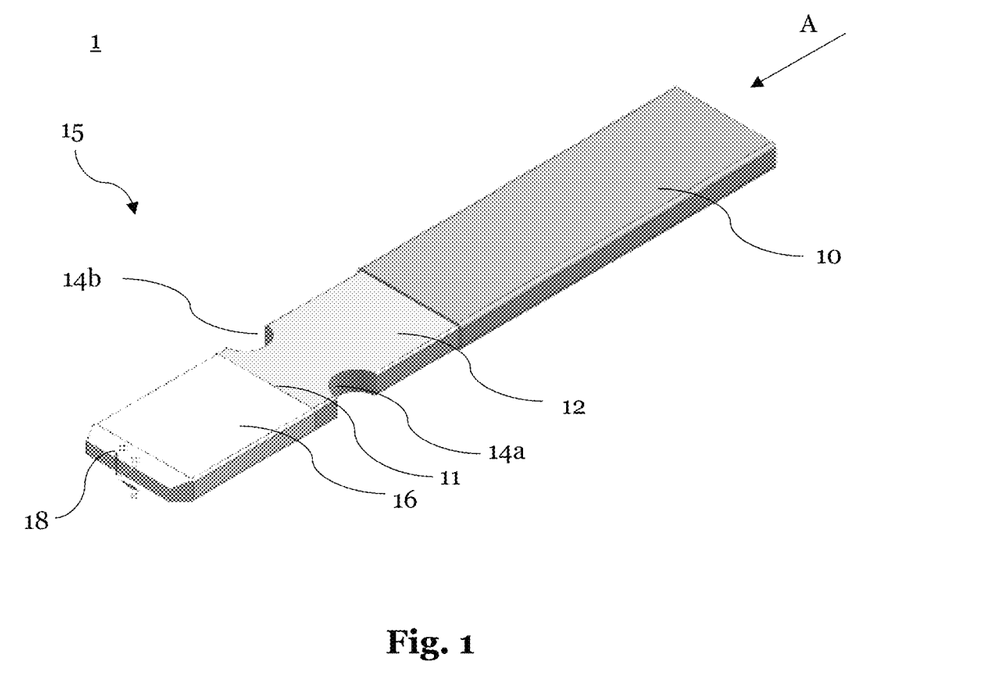
FIG. 1 is a schematic view of a busbar portion according to an embodiment.

FIG. 1 is a schematic view of a busbar portion 1 which includes a busbar conductor 12, and a busbar end 15 which is integrally formed with the busbar conductor 12. In the embodiment of FIG. 1, "integrally formed" means that a material of the busbar conductor 12 continuously transitions to the busbar end 15. Thus, no material boundary exists. Hence, the busbar end 15 may not be explicitly differentiated from the busbar conductor 12. Accordingly, the electric resistance is reduced. The busbar end 15 includes a rectangular cross section. Further, the busbar conductor 12 has the shape of a flat beam.

The busbar end 15, as depicted in FIG. 1, includes a connection portion 16. The connection portion 16 is configured for being plugged to a mating connector to establish an electrical connection. Moreover, the busbar end 15 further includes a plated area 11, in which a plating material is directly plated on the busbar conductor 12. The plated area 11 thereby partially corresponds to the connection portion 16. The plated area 11 encircles the busbar end 15.

A tip portion 18 of the connection portion 16 is not plated, as illustrated in FIG. 1. Each edge of the tip portion 18 which is perpendicular to the mating direction A is chamfered. Thus, the tip portion 18 has a tapered shape. The chamfered edges and the tapered shape may allow that the connection portion 16 of the busbar end 15 may be easily inserted into the mating connector.

The busbar portion 1 includes a retention means 14a, 14b, which is configured to engage with a corresponding retention means to receive pull forces being imposed on the busbar portion 1 in a direction opposite to the mating direction. As shown by FIG. 1, the busbar end 15 includes two retention means 14a, 14b, which are configured to engage with a corresponding retention means to receive pull forces being imposed on the busbar portion 1 in a direction opposite to the mating direction A. The two retention means 14a, 14b are recesses. The recesses 14a, 14b may have been formed by material deformation. The deformation may have been conducted by pressing and/or squeezing. Moreover, the recesses 14a, 14b may have also been formed by cutting, milling, machining and/or drilling. In the embodiment of FIG. 1, the retention means 14a, 14b are provided in a lateral narrow side of the rectangular cross section of the busbar end 15. The retention means 14a, 14b is not limited to the example listed above. For example, a retention means may also be provided in and/or on a wide flat part of the rectangular cross section of the busbar end. This is illustrated by means of the busbar portions 1a, 1c, and 1d of FIG. 3.

Figure 3:
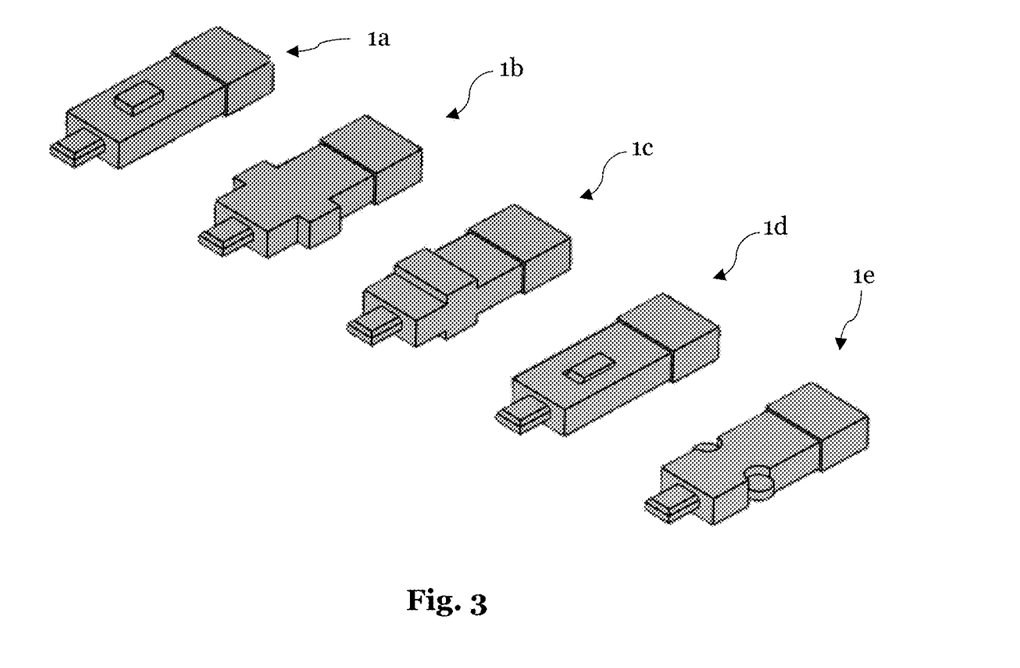
FIG. 3 is a schematic view of busbar portions including different retention means according to an embodiment.

Moreover, as illustrated by means of the busbar portions 1a, 1b, 1c, and 1e of FIG. 3, the retention means may also include one or more protrusions. The one or more protrusions can protrude from any side of the rectangular cross section of the busbar end.

Moreover, the busbar conductor 12 of the embodiment of FIG. 1 is partially surrounded by an isolation 10 or alternatively referred to as a coating or insulation. Thereby, the isolation 10 is removed from the busbar end 15.

Figure 2:
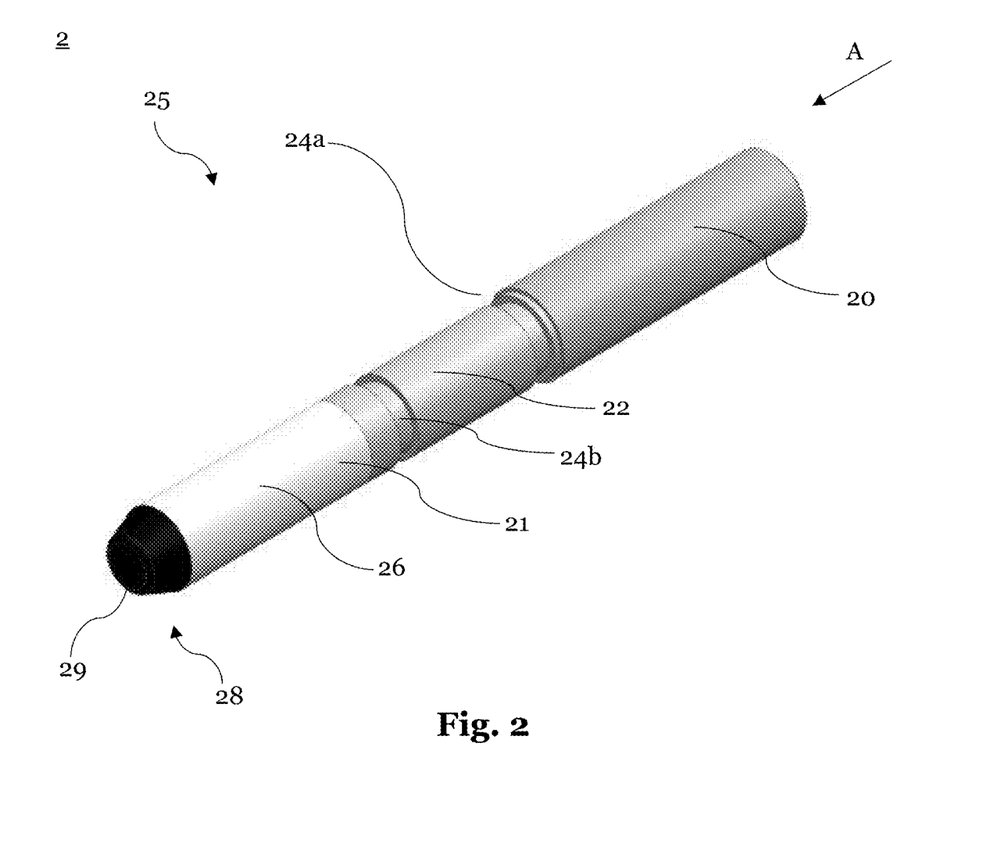
FIG. 2 is a schematic view of a busbar portion according to an embodiment.

FIG. 2 is a schematic view of a busbar portion 2 according to another embodiment of the present disclosure. The busbar portion 2 includes a busbar conductor 22, and a busbar end 25 which is integrally formed with the busbar conductor 22. In the embodiment of FIG. 2, "integrally formed" means that a material of the busbar conductor 22 continuously transitions to the busbar end 25. Thus, no material boundary exists. Hence, the busbar end 25 may not be explicitly differentiated from the busbar conductor 22. Accordingly, the electric resistance is reduced. The busbar end 25 includes an annular cross section. Further, the busbar conductor 22 has a cylindrical shape.

The busbar end 25, as depicted in FIG. 2, includes a connection portion 26. The connection portion 26 is configured for being plugged to a mating connector to establish an electrical connection. Moreover, the busbar end 25 further includes a plated area 21, in which a plating material is directly plated on the busbar conductor 22. Thereby, the plated area 21 partially corresponds to the connection portion 26. The plated area 21 encircles the busbar end 25. In further embodiments a coating may be applied over the plated area.

A tip portion 28 of the connection portion 26 is not plated, as illustrated in FIG. 2. Rather, a tip protection means 29 is attached at the tip portion 28. The tip protection means 29 may avoid a contact with a tip portion 28 of the connection portion 26. Particularly, a finger contact may be avoided. Thereby, the tip protection means has a tapered shape. The tapered shape may allow that the connection portion 26 of the busbar end 25 may be easily inserted into the mating connector.

Figure 4:
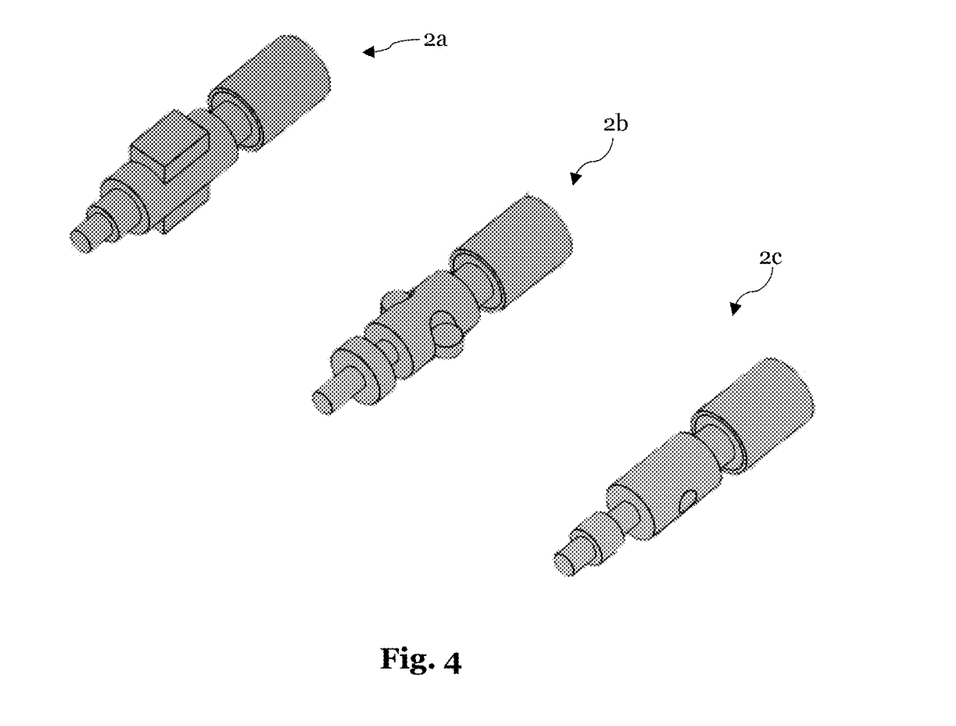
FIG. 4 is a schematic view of busbar portions including different retention means according to an embodiment.

As shown by FIG. 2, the busbar end 25 includes two retention means 24a, 24b, which are configured to engage with a corresponding retention means to receive pull forces being imposed on the busbar portion 2 in a direction opposite to a mating direction A. The two retention means 24a, 24b are recesses. These recesses 24a, 24b may be formed by material deformation. The deformation may have been conducted by pressing and/or squeezing. Moreover, the recesses 24a, 24b may have also been formed by cutting, milling, machining and/or drilling. Both recesses 24a, 24b encircle the busbar conductor 22. Moreover, both recesses 24a, 24b are grooves. It is understood that the retention means 24a, 24b may alternatively be in the form of or further include one or more protrusions which may protrude from any portion of the annular cross section of the busbar end 25. This is illustrated by means of the busbar portions 2a and 2b of FIG. 4. As further shown in FIG. 4 at the example of the busbar portion 2c, the retention means is formed into the annular cross section of the busbar end.

Further, the busbar conductor 22 of the embodiment of FIG. 2 is partially surrounded by an isolation 20 or alternatively referred to as a coating or insulation. Thereby, the isolation 20 is removed from the busbar end 25.

Figure 5:
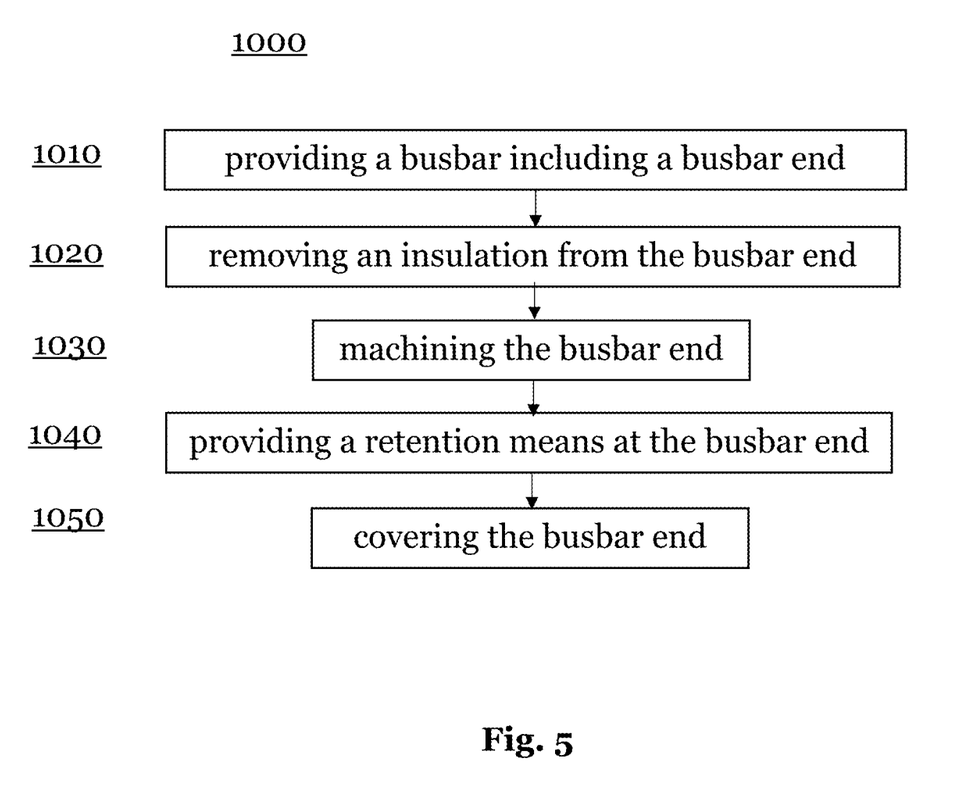
FIG. 5 is a flowchart of a method for manufacturing a busbar portion according to an embodiment.

FIG. 5 depicts a method 1000 for manufacturing a busbar portion 1; 2 according to the present disclosure. The method 1000 includes the steps of:

a) providing 1010 a busbar, including a busbar end;
b) optionally, removing 1020 an isolation 10 from a busbar end 15, 25;
c) optionally machining 1030 the busbar end 15, 25;
d) providing 1040 a retention means 14a, 14b; 24a, 24b at the busbar end 15, 25, and e) optionally covering 1050 the busbar end 15, 25.

The step 1050 of covering the busbar end may include coating an area of the busbar end 15, 25, plating an area of the busbar end 15, 25 and/or providing a sleeve which at least partially surrounds the busbar end 15, 25.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A busbar portion, comprising:
    a busbar conductor, and
    a busbar end which is integrally formed with the busbar conductor, wherein the busbar end includes a connection portion, wherein the connection portion is configured for being plugged to a mating connector to establish an electrical connection, wherein the busbar end further comprises a retention means which is configured to engage with a corresponding retention means to receive pull forces being imposed on the busbar portion in a direction opposite to a mating direction, wherein a cross section of the busbar conductor has a cross-sectional area from 80 mm$^2$ to 200 mm$^2$.

2. The busbar portion according to claim 1, wherein the busbar conductor comprises a conductor material, wherein the conductor material includes a material selected from a list consisting of: copper, aluminum, a copper based alloy and an aluminum based alloy.

3. The busbar portion according to claim 1, wherein the busbar end comprises a coated area in which a coating material is applied.

4. The busbar portion according to claim 3, wherein the coating material is selected from a list consisting of tin, nickel, silver, gold, a tin based alloy, and a nickel based alloy.

5. The busbar portion according to claim 4, wherein the busbar end further comprises a plated area, in which a plating material is plated on the busbar conductor.

6. The busbar portion according to claim 5, wherein the plating material includes a material selected from a list consisting of: tin, nickel, silver, gold, a tin based alloy, and a nickel based alloy.

7. The busbar portion according to claim 5, wherein the plating material is at least partially sandwiched between the busbar conductor and the coating material.

8. The busbar portion according to claim 4, wherein the plated area at least partially corresponds to the connection portion.

9. The busbar portion according to claim 1, wherein the busbar end is at least partially surrounded by an electrical conducting sleeve.

10. The busbar portion according to claim 1, wherein the connection portion comprises a tip portion, wherein an edge of the tip portion is chamfered.

11. The busbar portion according to claim 10, wherein the edge is preferably chamfered such that the tip portion has a tapered shape.

12. The busbar portion according to claim 1, wherein the busbar end comprises a rectangular cross section, wherein the rectangular cross section has a width from 15 mm to 45 mm and wherein the rectangular cross section has a height from 2 mm to 7 mm.

13. The busbar portion according to claim 1, wherein the busbar end comprises an annular cross section, wherein the annular cross section preferably has a diameter from 10 mm to 16 mm.

14. The busbar portion according to claim 1, wherein the busbar portion is configured for being used in a high-voltage circuit of an electrical vehicle.

15. The busbar portion according to claim 14, wherein the busbar portion is preferably configured for conducting just one electrical phase.

16. The busbar portion according to claim 1, wherein the retention means is a recess and/or a protrusion, wherein the retention means preferably encircles the busbar conductor, wherein the retention means is further preferably formed by deformation.

17. A busbar, comprising:
   the busbar portion according to claim 1; and
   at least another busbar end.

18. A wiring harness, in particular for an electrical vehicle, wherein the wiring harness comprises a busbar according to claim 17.

19. A method for manufacturing a busbar portion, comprising:
   providing a busbar, including a busbar end; and
   providing a retention means at the busbar end.

20. The method of claim 19, further comprising removing an isolation from the busbar end.

21. The method of claim 19, further comprising machining the busbar end.

22. The method of claim 21, further comprising covering the busbar end.

23. The method of claim 22, wherein means for covering the busbar end is selected from a list consisting of: coating an area of the busbar end, plating an area of the busbar end, and providing a sleeve which at least partially surrounds the busbar end.

* * * * *